(12) United States Patent
Fagone et al.

(10) Patent No.: US 7,962,756 B2
(45) Date of Patent: Jun. 14, 2011

(54) METHOD AND APPARATUS FOR PROVIDING AUTOMATIC GENERATION OF WEBPAGES

(75) Inventors: Peter Fagone, West Orange, NJ (US); David J. Hendrie, Morristown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1058 days.

(21) Appl. No.: 11/555,137

(22) Filed: Oct. 31, 2006

(65) Prior Publication Data
US 2008/0104700 A1    May 1, 2008

(51) Int. Cl.
*G06F 11/30* (2006.01)
*G06F 11/00* (2006.01)

(52) U.S. Cl. .............. 713/188; 726/22; 726/23; 726/24; 726/25

(58) Field of Classification Search .............. 726/22–25; 713/188
See application file for complete search history.

(56) References Cited

U.S. PATENT DOCUMENTS

| | | | |
|---|---|---|---|
| 6,035,330 A * | 3/2000 | Astiz et al. ................... 709/218 |
| 6,757,685 B2 * | 6/2004 | Raffaele et al. ....................... 1/1 |
| 6,907,533 B2 * | 6/2005 | Sorkin et al. ................... 726/22 |
| 7,062,475 B1 * | 6/2006 | Szabo et al. ................... 706/11 |
| 7,457,823 B2 * | 11/2008 | Shraim et al. ....................... 1/1 |
| 2002/0116549 A1 * | 8/2002 | Raffaele et al. ............... 709/330 |
| 2002/0157021 A1 * | 10/2002 | Sorkin et al. ................... 713/201 |
| 2005/0166072 A1 * | 7/2005 | Converse et al. ............. 713/201 |
| 2005/0210534 A1 | 9/2005 | Krishnamurthy |
| 2008/0098476 A1 * | 4/2008 | Syversen ........................ 726/23 |
| 2009/0241191 A1 * | 9/2009 | Keromytis et al. ............. 726/23 |

OTHER PUBLICATIONS

International Search Report and Written Opinion for PCT/US2007/082223, Nov. 13, 2008, consists of 11 unnumbered pages.
Sion, R. et al., "On the fly intrusion detection for web portals", Information Technology: Coding and Computing [Computers and Communications], 2003. Proceedings. ITCC 2003. International Conference on Apr. 28-30, 2003,pp. 325-330.

* cited by examiner

*Primary Examiner* — Nasser Moazzami
*Assistant Examiner* — Mohammad W Reza

(57) ABSTRACT

A method and apparatus to quickly provide a plurality of customized deceptive web pages that is designed to feed an intruder with a number of intrusion opportunities are disclosed. For example, the present method receives a plurality of parameter of interest and "look and feel" information. The method then applies the plurality of parameter of interest and the look and feel information to automatically generate a plurality of web pages for use in a security system, e.g., a honeypot system.

14 Claims, 4 Drawing Sheets

METHOD AND APPARATUS FOR PROVIDING AUTOMATIC GENERATION OF WEBPAGES

The present invention relates generally to communication networks and, more particularly, to a method and apparatus for providing automatic generation of web pages for use in a network security system.

BACKGROUND OF THE INVENTION

In order to improve existing network security and to provide early detection of network security intrusions, companies often need to understand the behaviors of and the techniques used by hackers. Very often, companies use honeypot systems to meet this need. A honeypot is a closely monitored decoy system (e.g., one or more web pages) placed on a network or the Internet that is set up to attract and trap attackers such as hackers who attempt to penetrate systems or networks. However, the setup of a honey pot system and its associated decoy environments, such as web pages, files, and data, can be time consuming and manually intensive.

Therefore, a need exists for a method and apparatus for providing automatic generation of web pages for use in a network security system.

SUMMARY OF THE INVENTION

In one embodiment, the present invention enables a method to quickly provide a plurality of customized deceptive web pages that is designed to feed an intruder with a number of intrusion opportunities. For example, the present method receives a plurality of parameter of interest and "look and feel" information. The method then applies the plurality of parameter of interest and the look and feel information to automatically generate a plurality of web pages for use in a security system, e.g., a honeypot system.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
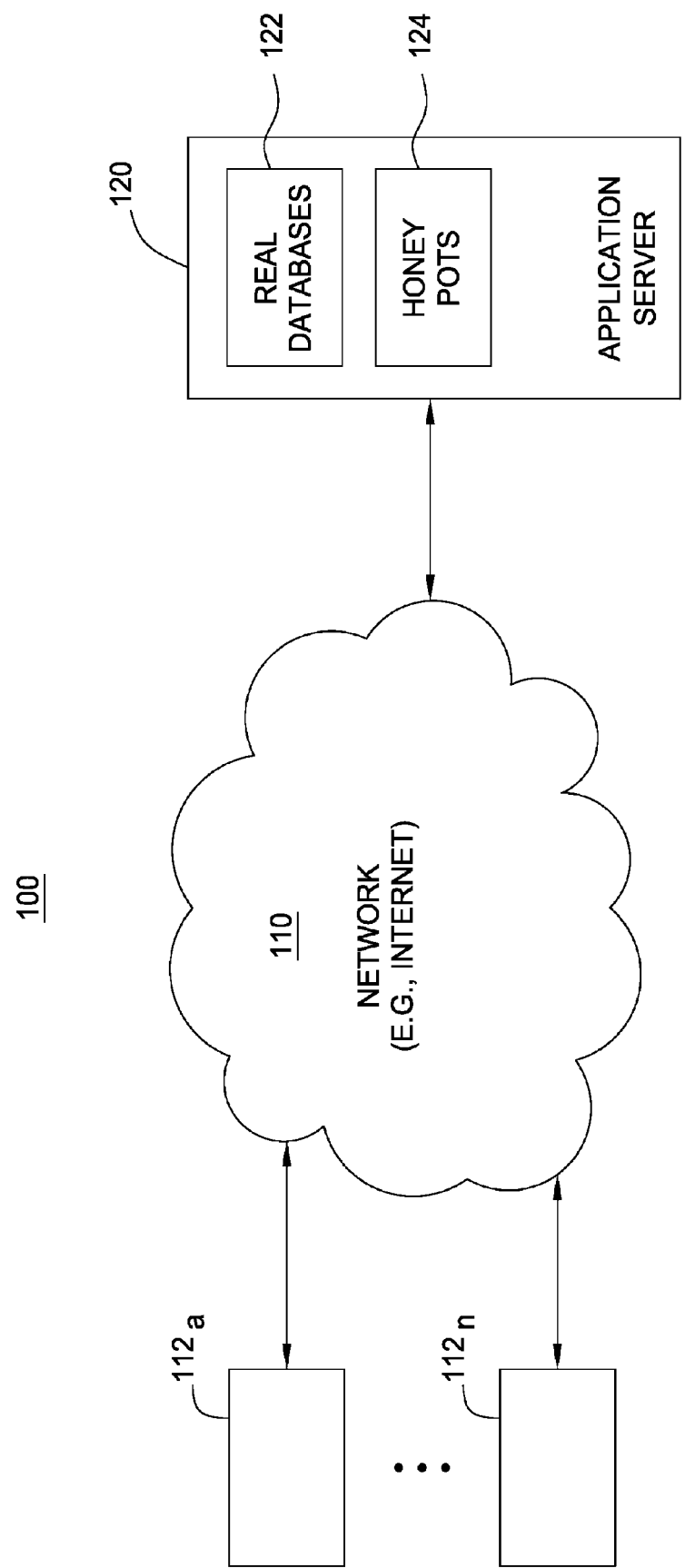
FIG. 1 illustrates an illustrative network of the present invention.

FIG. 1 illustrates an illustrative network 100 of the present invention. For example, a plurality of users 112a-n may access a network 110, e.g., the Internet, to access an application server 120. The application server may be operated by an enterprise customer of a service provider for providing information its customers or employees. As such, the application server may have real databases that contain valuable information. For example, these real databases may contain product/service information that will support a website that will allow a customer to purchase products or to subscribe to services. Furthermore, these real databases may contain data that are intended to be used only by authorized users, such as employees of an enterprise customer. These private databases may contain corporate information, accounting information, financial information, billing information, transaction information, medical information, customer information, and the like.

Although most of the users 112a-n are legitimate users who will access application sever 120 for legitimate reasons, there are those who are hackers who will attempt to access protected information located on the application server without the proper authorization. In one embodiment, the application server may deploy one or more honey pots 124 for thwarting the hackers' attempt to breach security measures and also to possibly gain insights into the intent of the hackers.

In order to improve existing network security and provide early detection of network security intrusions, companies often need to understand the behaviors of and the techniques used by hackers. Very often, companies use honeypot systems to meet this need. A honeypot is a closely monitored decoy system (e.g., one or more web pages) put on a network or the Internet that is set up to attract and trap attackers such as hackers who attempt to penetrate systems or networks. The key idea is to deceive the attacker by making the honeypot seems like a legitimate system. A honeypot system can also be a decoy-based Intrusion Detection System (IDS) in corporate network environments that provide effective early detection of intrusion threats. Honeypot is typically a virtual system residing in a network that emulates a real system by simulating running services and open ports; therefore, honeypot can help to gather information about new attacks, exploitation trends, and hacking techniques used by intruders. Generally, a honeypot consists of a computer, data or a network site that appears to be part of a network which is actually isolated and protected and contains information that would be of value to hackers. The primary value of a honeypot is to provide information which can be used for early intrusion detection, warning, prediction, and awareness. Since a honeypot system is not a production system, it should not receive any traffic or activity at all. If a honeypot does capture any activity, the activity is most likely unauthorized and originated by a hacker with malicious intents. However, the setup of a honey pot system and its associated decoy environments, such as web pages, files, and data, can be time consuming and manually intensive.

To address this criticality, the present invention enables a method to quickly and accurately implement or provide specialized deceptive web pages needed by a honeypot associated website that is designed to feed an intruder with a number of intrusion opportunities. One aspect of the present invention is that it reduces the time needed to create usable deceptive web pages to a point where the time needed to construct these deceptive web pages is negligible. For example, an owner of an application server or a web site may provide a plurality of parameters that are likely to be of interest to unauthorized users. Examples of parameters may include, but are not limited to, customer information (e.g., name, address, social security number, phone number, birthday, and the like), security information (e.g., passwords, access codes, private keys), financial information (e.g., account number, billing information, transaction information, credit information and the like), product information (e.g., product designs, product launch date, product cost, product blueprints, product part lists, and the like), contact information (e.g., client listings, client phone numbers, client email addresses) and so on. The owner of an application server or a web site may also provide look and feel information, e.g., company trademarks, company slogans, company logos, company colors, company images, and the like. Using the provided parameters and look and feel information, the present invention is able to quickly generate a plurality of specialized deceptive web pages.

In one embodiment, the present invention can identify the motives and intentions of an intruder. For instance, a honeypot service provider may provide the prospective intruder with a number of choices including, but not limited to, those that address the following topics:
 a financial malfeasance;
 corporate espionage;
 national security espionage;
 unauthorized access to classified information;
 unbecoming conduct.
Note that the aforementioned items are only a very small subset of the possible types of potential information paths that can be presented to the un-authorized honeypot intruder who may have already ignored the warnings to stay away and has, therefore, identified oneself as a person of interest.

In one embodiment, the present invention enables a provider of honeypot services to change, in a close to real-time basis, the web pages that will be presented to the intruder. One feature of the present invention enables the ability to design a customer facing page for a honeypot website that is capable of creating appropriately structured subsequent links. If the customer facing honeypot web page is properly constructed, a honeypot service provider can craft a set of predefined links on the web page to determine the intent of the intruder. If the intruder's intent is known, then the honeypot service provider can focus on the proper forms on subsequent web pages to respond to the intrusion.

Thus, the present invention enables a honeypot service provider to include and or change honeypot web page contents at will. This gives the service provider the ability to change the apparent and the actual contents of the website with a minimal number of alterations. This implies that the visual contents of the website can be customized differently for each individual customer.

In one embodiment, the present invention enables a table driven script, or program. The program is constructed in such a way that it can generate a file that comprises a set of web pages that is immediately usable in a honeypot system. For example, the program receives two sets of inputs: 1) parameters of interest and 2) look and feel information for generating a honeypot website. These two sets of information are derived from inputs provided by owners of application servers or web sites. The speedy and nimble execution of the program will allow a honeypot service provider to provision and support a large number of potential honeypot customers in a relatively short time. More importantly, the program will greatly reduce the amount of time a honeypot service provider will need to spend on provisioning a new instance of a honeypot for an individual customer.

Figure 2:
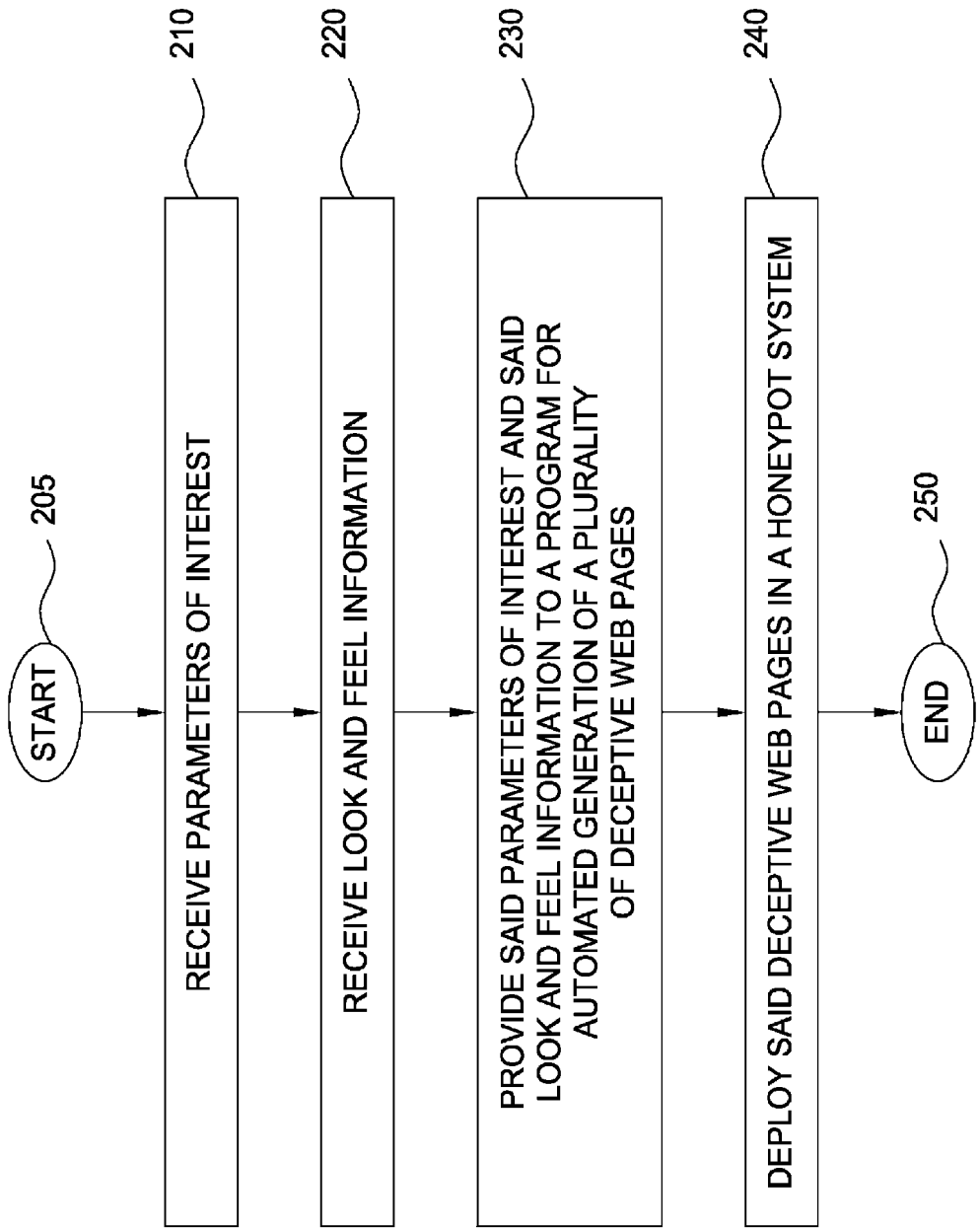
FIG. 2 illustrates a flowchart of a method for a honeypot system generation flow of the present invention.

FIG. 2 illustrates a flowchart of a method 200 for generating automatically a plurality of deceptive web pages. Method 200 starts in step 205 and proceeds to step 210.

In step 210, the method receives a plurality of parameters of interest from an owner of an application server or a web site. For example, the plurality of parameters of interest may include customer information (e.g., name, address, social security number, phone number, birthday, and the like), security information (e.g., passwords, access codes, private keys), financial information (e.g., account number, billing information, transaction information, credit information and the like), product information (e.g., product designs, product launch date, product cost, product blueprints, product part lists, and the like), contact information (e.g., client listings, client phone numbers, client email addresses) and so on.

In one embodiment, the received parameters of interest can be organized hierarchically. For example, a parameter of interest can be "accounting information" which can be perceived as a parent parameter, whereas "tax information" can be a child parameter, whereas "tax return for 2005" can be a grandchild parameter, so on. This hierarchical organization of the parameters of interest will allow the program to not only automatically generates a set of links, but to generate a hierarchical set of links as further described below.

In step 220, the method receives look and feel information from an owner of an application server or a web site. For example, the owner of an application server or a web site may also provide look and feel information, e.g., company trademarks, company slogans, company logos, company colors, company images, and the like.

In step 330, the method uses the parameters of interest and the look and feel information as inputs to a program to generate a plurality of deceptive (e.g., honeypot) web pages. Namely, the program is designed to simply apply the look and feel information in one or more predefined ways to generate the plurality of deceptive web pages. For example, if the look and feel information contains a company color then the background of the web page can be set to that color. If a border pattern is provided, then the border pattern is deployed on the web page. If a company logo is provided, the company logo is deployed on one of the corners of the web page. If an image or an image sequence is provided, then the image or an image sequence is deployed on the web page.

Furthermore, the program will generate a plurality of links in accordance with the parameters of interest on the web page, e.g., a front end customer facing web page. For example, a link called "financial information" can be generated if a "financial information" parameter of interest is received. Furthermore, if the parameters of interest are hierarchically organized, then a plurality of hierarchical links can be generated. For example, if "tax information" is a child parameter to the parent "financial information" parameter, then a link for tax information is also created, but it will only be displayed if the "financial information" link is accessed first, e.g., clicked. Thus, a customized web page can be easily and automatically generated by the program.

In step 240, the method deploys the generated honeypot web pages in a honeypot system. The method ends in step 250.

Figure 3:
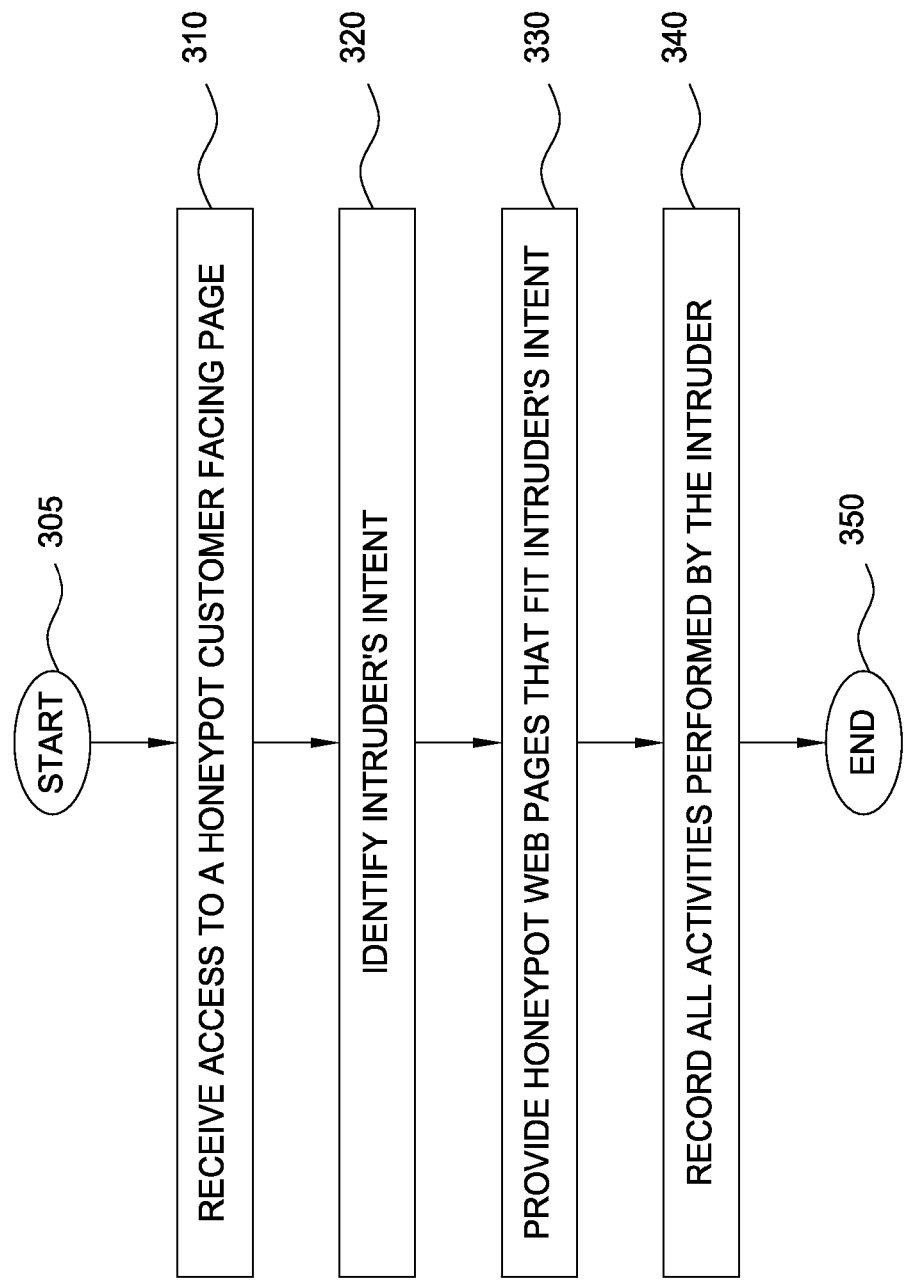
FIG. 3 illustrates a flowchart of a method for handling intrusion flow by a honeypot system of the present invention.

FIG. 3 illustrates a flowchart of a method 300 for handling intrusion flow by a honeypot system of the present invention. Method 300 starts in step 305 and proceeds to step 310.

In step 310, the method receives an access to a front end customer facing web page of a honeypot system. For example, an intruder has uncovered the front end customer facing web page which was intentionally deployed to be found by hackers.

In step 320, the method identifies the intent of an intruder using pre-designed links on the front end web page. As discussed above, the program in method 200 is able to automatically generate a plurality of links that are correlated to a plurality of parameters of interest. Depending on which link that the intruder is trying to access, method 300 is then able to determine the intent of the intruder. For example, if the intruder is presented with three (3) links on the front end web page, "financial information", "customer information" and "transaction information", and the intruder attempts to gain access to the "financial information" link, then method 300 is able to identify that the intruder's intent to gain access to the financial information that is believed by the intruder to be stored on the web site. Thus, method 300 may deduce the intent of the intruder by assessing a pattern of access of the plurality of web pages.

In step 330, the method provides subsequent web pages that can be traversed by the intruder to fit the intruder's intent. For example, when the intruder clicks on the "financial information" link, method 300 may present the intruder with a different webpage. However, in one embodiment, method 300 simply presents a response that will stop the intruder from progressing any further, but at the same time, allows the intruder an opportunity to return. For example, the response may be "The financial information database is currently undergoing an update process, but will be available tomorrow". This response will stop the intruder, but it also presents an opportunity for the intruder to return, thereby allowing method 300 to assess the degree of interest of the intruder. However, if the intruder does in fact return the next day, then method 300 may present the next hierarchical link or links to the intruder, e.g., a "tax information" link and a "corporate profit report" link. If the intruder clicks on the "tax information" link, then method 300 may again present another response that will stop intruder but at the same time, allows the intruder an opportunity to return. For example, the response may be "Tax documents have not been validated, where validation will be completed in a week". As such, this process can be continued again and again by method 300 to gauge the degree of interest of the intruder. One novel aspect of the present invention is the automated nature of the present invention, where a realistic set of web pages can be quickly generated for a client by using a program that simply uses two simple sets of inputs.

In step 340, the method records all activities performed by the intruder. The method ends in step 350.

Figure 4:
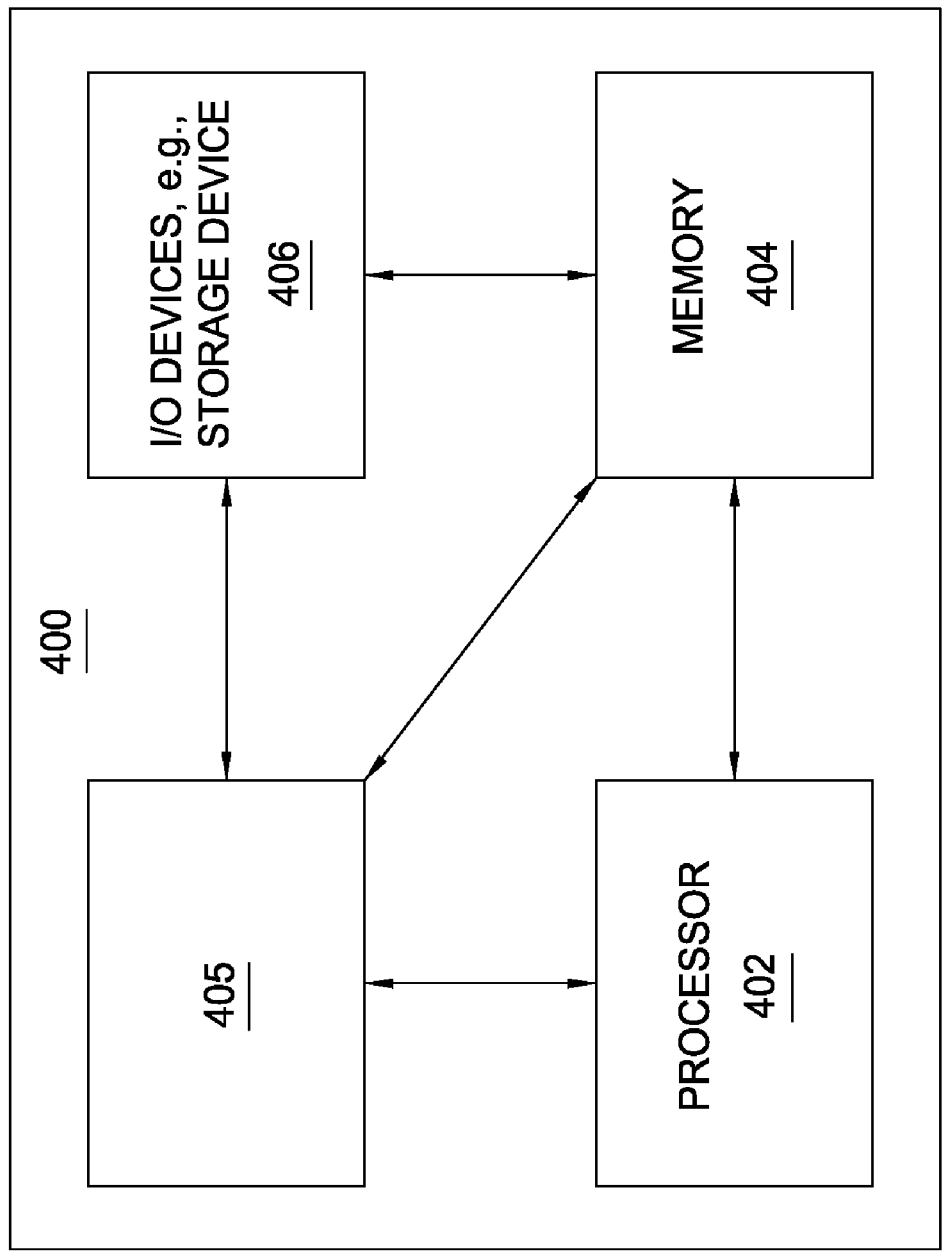
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), an automatic generation of web pages module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present automatic generation of web pages module or process 405 can be loaded into memory 404 and executed by processor 402 to implement the functions as discussed above. As such, the present automatic generation of web pages process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for generating a plurality of web pages, comprising:
receiving a plurality of parameters of interest;
receiving look and feel information;
applying the plurality of parameters of interest and the look and feel information to automatically generate the plurality of web pages for use in a security system, wherein a web page of the plurality of web pages contains a plurality of links that is correlated to the plurality of parameters of interest, wherein the plurality of links is organized in a hierarchical order;
determining an intent of an intruder based upon a pattern of access of the plurality of web pages; and
providing subsequent web pages that are accessible by the intruder to fit the intent of the intruder.

2. The method of claim 1, wherein the security system is a honeypot system.

3. The method of claim 1, wherein the plurality of parameters of interest is organized into a hierarchical order.

4. The method of claim 1, further comprising:
deploying the plurality of web pages in the security system.

5. The method of claim 4, further comprising:
receiving an access request to a web page of the plurality of web pages in the security system.

6. The method of claim 5, further comprising:
presenting the plurality of links in a sequence of web pages in accordance with the hierarchical order.

7. A non-transitory computer-readable medium having stored thereon a plurality of instructions, the plurality of instructions including instructions which, when executed by a processor, cause the processor to perform a method for generating a plurality of web pages, comprising:
receiving a plurality of parameters of interest;
receiving look and feel information;
applying the plurality of parameters of interest and the look and feel information to automatically generate the plurality of web pages for use in a security system, wherein a web page of the plurality of web pages contains a plurality of links that is correlated to the plurality of parameters of interest, wherein the plurality of links is organized in a hierarchical order;
determining an intent of an intruder based upon a pattern of access of the plurality of web pages; and
providing subsequent web pages that are accessible by the intruder to fit the intent of the intruder.

8. The non-transitory computer-readable medium of claim 7, wherein the security system is a honeypot system.

9. The non-transitory computer-readable medium of claim 7, wherein the plurality of parameters of interest is organized into a hierarchical order.

10. The non-transitory computer-readable medium of claim 7, further comprising:
deploying the plurality of web pages in the security system.

11. The non-transitory computer-readable medium of claim 10, further comprising:
receiving an access request to a web page of the plurality of web pages in the security system.

12. The non-transitory computer-readable medium of claim 11, further comprising:
presenting the plurality of links in a sequence of web pages in accordance with the hierarchical order.

13. An apparatus for generating a plurality of web pages, comprising:

means for receiving a plurality of parameters of interest;

means for receiving look and feel information;

means for applying the plurality of parameters of interest and the look and feel information to automatically generate the plurality of web pages for use in a security system, wherein a web page of the plurality of web pages contains a plurality of links that is correlated to the plurality of parameters of interest, wherein the plurality of links is organized in a hierarchical order;

means for determining an intent of an intruder based upon a pattern of access of the plurality of web pages; and means for providing subsequent web pages that are accessible by the intruder to fit the intent of the intruder.

14. The apparatus of claim 13, wherein the security system is a honeypot system.

* * * * *